(12) United States Patent
Goligorsky et al.

(10) Patent No.: US 11,867,337 B2
(45) Date of Patent: *Jan. 9, 2024

(54) SYSTEMS AND METHODS FOR SEALING PIPELINES

(71) Applicant: CURAPIPE SYSTEM LTD., Kiryat Malachi (IL)

(72) Inventors: Piter Goligorsky, Kadima Zoran (IL); Peter Paz, Har Adar (IL); David Hercky, Raanana (IL)

(73) Assignee: Curapipe System, Ltd., Kiryat Malachi (IL)

(*) Notice: Subject to any disclaimer, the term of this patent is extended or adjusted under 35 U.S.C. 154(b) by 0 days.

This patent is subject to a terminal disclaimer.

(21) Appl. No.: 17/599,545

(22) PCT Filed: Mar. 18, 2020

(86) PCT No.: PCT/IL2020/050321
§ 371 (c)(1),
(2) Date: Sep. 28, 2021

(87) PCT Pub. No.: WO2020/202133
PCT Pub. Date: Oct. 8, 2020

(65) Prior Publication Data
US 2022/0146035 A1    May 12, 2022

Related U.S. Application Data

(60) Provisional application No. 62/827,870, filed on Apr. 2, 2019.

(51) Int. Cl.
  *F16L 55/164*    (2006.01)
  *C09K 3/10*      (2006.01)
  *F16L 101/60*    (2006.01)

(52) U.S. Cl.
  CPC .......... *F16L 55/164* (2013.01); *C09K 3/1015* (2013.01); *C09K 3/1028* (2013.01); *F16L 2101/60* (2013.01)

(58) Field of Classification Search
  CPC .. F16L 55/164; F16L 2101/60; C09K 3/1028; C09K 3/1015
  USPC .......................................................... 138/89
  See application file for complete search history.

(56) References Cited

U.S. PATENT DOCUMENTS

| | | | |
|---|---|---|---|
| 4,996,940 A * | 3/1991 | Cleary | F16L 55/1645 118/317 |
| 11,009,175 B2 * | 5/2021 | Perstnev | F16L 55/42 |

* cited by examiner

*Primary Examiner* — Craig M Schneider
*Assistant Examiner* — David R Deal
(74) *Attorney, Agent, or Firm* — Eva Leah Taksel

(57) ABSTRACT

The present invention provides systems and methods for curing at least one leakage in a pipeline, the system including at least one fiber-in-sealant-in carrier fluid (FISIC) composition and at least one gel pig composition; wherein the at least one FISIC composition and the at least one gel pig form a pig train, are adapted to move along the pipeline to a region of the leakage and to seal and cure the at least one leakage.

20 Claims, 7 Drawing Sheets

Entrapment

SYSTEMS AND METHODS FOR SEALING PIPELINES

FIELD OF THE INVENTION

The present invention relates generally to fibers-in-liquid sealant compositions for use in pipelines and methods for producing them, and more specifically to methods and apparatus for use in sealing leaks in water pipelines.

BACKGROUND OF THE INVENTION

Many liquids are transported via subterranean/underwater pipelines. When a leakage crack or hole forms in the pipeline, the liquid leaks therefrom. Often, it takes a long time to detect a leakage and yet longer to locate the leakage site. Oil, gas and water transportation are thus subject to tremendous losses due to pipeline leakage.

There is thus a need to maintain and seal leaky subterranean/underwater pipelines quickly in situ. A non-limiting example could be potable water pipes that leak due to defects in the pipe materials. These could be defective lead-run cast iron joints, defective asbestos cement collars, longitudinal cracks in PVC pipes and in ferrous pipes caused by hoop stress, split bell caused by transverse stresses on the pipe joint, circumferential breaks due to longitudinal thermal contraction, displaced 'O' rings on PVC joints, failed welds on MDPE joints and service connections on the external ferrule connecting the customer service pipe to the mains. Typical leak sizes can range from 4 liters-per-hour to 15,000 liters-per-hour.

Many industrial applications use fibers. Typically, fibers are used in compositions for building purposes. Some fibers are in the form of a yarn, that is, a continuous often-plied strand composed of either natural or man-made fibers or filaments. In one non-limiting example, hemp yarn has a size of Nm 10 (Nm 10 yarn=10,000 meters per kilogram, or about 4,960 yards per pound) from single to multiple plies of 2, 3, 6 and 12 in either natural or bleached (using peroxide) Made from earth-friendly wet spun hemp, these yarns are smooth and durable The yarns may be provided on spools or in packages and may be single-ply, 2-ply, 3-ply, 5-ply, 6-ply and 12-ply or combinations thereof.

There still remains an urgent need to develop systems and methods for sealing and curing pipeline leakages, with long-term curing effects.

SUMMARY OF THE INVENTION

It is an object of some aspects of the present invention to provide methods of forming fiber-in-liquid sealant compositions for use in systems and methods for sealing and/or curing pipeline leakages. The cured pipelines have been tested for long-term curing. It has been found that the longevity of cured pipes applying the fibers-in-sealant composition exceeds 10 to 20 years.

The present invention provides systems and methods for curing at least one leakage in a pipeline, the system including at least one fiber-in-sealant-in-carrier-fluid (FISIC) composition and at least one gel pig composition; wherein the at least one FISIC composition and the at least one gel pig form a pig train, are adapted to move along the pipeline to a region of the leakage and to seal and later cure the at least one leakage.

In some embodiments of the present invention, improved methods are provided for producing fiber-in-liquid sealant compositions. The fibers may be single fibers and/or in a yarn (a continuous often-plied strand, composed of either natural or man-made fibers or filaments).

In other embodiments of the present invention, a method and system are provided for sealing water transport pipelines.

The present invention provides systems and methods for curing at least one leakage in a pipeline, the system including at least one fiber-in-sealant composition, carried-in-a-carrier fluid (collectively termed herein "FISIC composition") and at least one gel pig composition; wherein the at least one fiber-in-liquid composition in the carrier fluid and the at least one gel pig form a pig train, adapted to move along the pipeline to a region of the leakage and to seal and cure the at least one leakage.

There is thus provided according to an embodiment of the present invention, a system for sealing at one leakage site in a pipeline, the system including;
 a) at least one gel pig; and
 b) at least one fiber-in-sealant composition in a carrier fluid (FISIC composition); wherein the at least one gel pig and the least one FISIC composition form a pig train, adapted to move along the pipeline to a region of the at least one leakage and to seal the at least one leakage.

There is thus provided according to another embodiment of the present invention, a system for sealing and curing at one leakage site in a pipeline, the system including;
 a) at least one gel pig; and
 b) at least one FISIC composition;
 wherein the at least one gel pig and the least one FISIC composition form a pig train, adapted to move along the pipeline to a region of the at least one leakage and to seal and cure the at least one leakage.

Additionally, according to an embodiment of the present invention, the at least one gel pig includes one gel pig and the at least one FISIC composition includes one FISIC composition.

Furthermore, according to an embodiment of the present invention, the at least one gel pig includes two gel pigs and the at least one FISIC composition in a carrier fluid includes one FISIC composition.

Further, according to an embodiment of the present invention, the at least one gel pig includes three gel pigs and the at least one FISIC composition includes two FISIC compositions.

Moreover, according to an embodiment of the present invention, the pig train is adapted to move along the pipeline at a speed of 0.01 to 20 m/s.

Additionally, according to an embodiment of the present invention, the at least one gel pig includes one rear pig.

Furthermore, according to an embodiment of the present invention, the at least one of the two pigs has an average diameter of at least 5% less than an internal diameter of the pipeline.

Additionally, according to an embodiment of the present invention, at least one of the two pigs has an average diameter of at least 10% less than an internal diameter of the pipeline.

Additionally, according to an embodiment of the present invention, the at least one gel pig includes;
 a. a cellulosic polysaccharide;
 b. a surfactant; and
 c. water.

Furthermore, according to an embodiment of the present invention, the at least one gel pig further includes;
 d. a filler; and
 e. a metallic hydroxide.

Additionally, according to an embodiment of the present invention, the at least one gel pig further includes an oil.

Moreover, according to an embodiment of the present invention, the at least one gel pig includes a rear pig and a front pig of different compositions.

Additionally, according to an embodiment of the present invention, the pig train is adapted to conform to an inner profile of the pipeline.

Furthermore, according to an embodiment of the present invention, the inner profile of the pipeline is reduced in diameter in at least one section by at least 20%.

Additionally, according to an embodiment of the present invention, the inner profile of the pipeline is reduced in diameter in at least one section by at least 50%.

Further, according to an embodiment of the present invention, the inner profile of the pipeline is reduced in diameter in at least one section by at least 75%.

Yet further, according to an embodiment of the present invention, the inner profile of the pipeline is further increased in the diameter in at least one section by at least 20%.

Additionally, according to an embodiment of the present invention, the inner profile of the pipeline is increased in the diameter in at least one section by at least 50%.

Importantly, according to an embodiment of the present invention, the inner profile of the pipeline is increased in the diameter in at least one section by at least 75%.

Additionally, according to an embodiment of the present invention, A the system further includes a pressurized fluid for propelling the system from a first end thereof along the pipeline.

Furthermore, according to an embodiment of the present invention, the pressurized fluid includes a liquid.

Additionally, according to an embodiment of the present invention, the pressurized fluid includes a gas.

Furthermore, according to an embodiment of the present invention, the pressurized fluid includes a tri-phase composition.

Additionally, according to an embodiment of the present invention, the pressurized fluid is at a pressure of 1-150 bar.

Moreover, according to an embodiment of the present invention, the pig train is adapted to prevent a bypass of a propelling product by of more than 30%.

Additionally, according to an embodiment of the present invention, the pig train is adapted to be extracted from the pipeline via a conduit of less than two inch diameter at a pressure of less than 3 bar.

Additionally, according to an embodiment of the present invention, the system further includes a counter pressurized fluid for counter-pressurizing the pig train from a second end thereof.

Furthermore, according to an embodiment of the present invention, the counter pressurized fluid is for controlling velocity of movement of the pig train along the pipeline.

Additionally, according to an embodiment of the present invention, the pig train can be launched from a pipe of a diameter of less than 75% of the pipeline.

Further, according to an embodiment of the present invention, the pig train can be launched from a pipe of a diameter of less than 50% of the pipeline.

Additionally, according to an embodiment of the present invention, herein the pig train can be launched from a pipe of a diameter of less than 75% of the pipeline.

Additionally, according to an embodiment of the present invention, A the pig train can be launched from a pipe at an angle of greater than 30° to the pipeline.

Further, according to an embodiment of the present invention, the pig train can be launched from a pipe at an angle of greater than 60° to the pipeline.

Yet further, according to an embodiment of the present invention, the pig train can be launched from a pipe at an angle of greater than 80° to the pipeline.

Additionally, according to an embodiment of the present invention, the pig train can be launched from a pipe at a pressure in the range of 2-15 bar.

Moreover, according to an embodiment of the present invention, the pig train can be launched from a pipe at a pressure of 0.4-20 bar.

Additionally, according to an embodiment of the present invention, the pig train is adapted to travel through an obstruction in the pipeline and to be operative thereafter.

Further, according to an embodiment of the present invention, the obstruction selected from the group consisting of tuberculation, encrustation, a butterfly valve, a wedge, a nail, a screw, an obstructing element, an in-pipe meter, a service pipe ferrule, a baffle, a broomstick seal and combinations thereof.

The present invention will be more fully understood from the following detailed description of the preferred embodiments thereof, taken together with the drawings.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1A is a simplified pictorial illustration showing a fiber-in-liquid system for sealing a pipeline, in accordance with an embodiment of the present invention;

FIG. 1B is a simplified pictorial illustration showing another fiber-in-liquid system for sealing a pipeline, in accordance with an embodiment of the present invention;

FIG. 1C is a simplified pictorial illustration showing another fiber-in-liquid system for sealing a pipeline, in accordance with an embodiment of the present invention;

FIG. 1D is a simplified pictorial illustration showing another fiber-in-liquid system for sealing a pipeline, in accordance with an embodiment of the present invention;

FIG. 2 is a simplified flow chart of a method for sealing a pipeline, in accordance with an embodiment of the present invention;

FIG. 3 is a simplified flow chart of another method for sealing a pipeline, in accordance with an embodiment of the present invention;

FIG. 4 is a simplified flow chart of another method for sealing a pipeline, in accordance with an embodiment of the present invention;

FIG. 5 is a simplified schematic illustration showing a system for sealing a pipeline, in accordance with an embodiment of the present invention;

FIG. 6 is a simplified pictorial illustration of a fiber before and after being soaked in a liquid, in accordance with an embodiment of the present invention;

FIG. 7 is a simplified pictorial illustration of a three dimensional structure of fibers trapping liquid, in accordance with an embodiment of the present invention;

FIG. 8 shows a simplified flowchart of a method for the preparation of a fibers-in-sealant composition-in-a-carrier-fluid, in accordance with an embodiment of the present invention;

Figure 9:
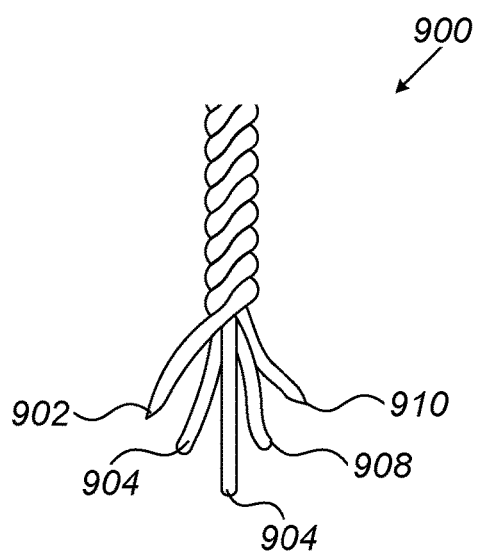
Figure 10:
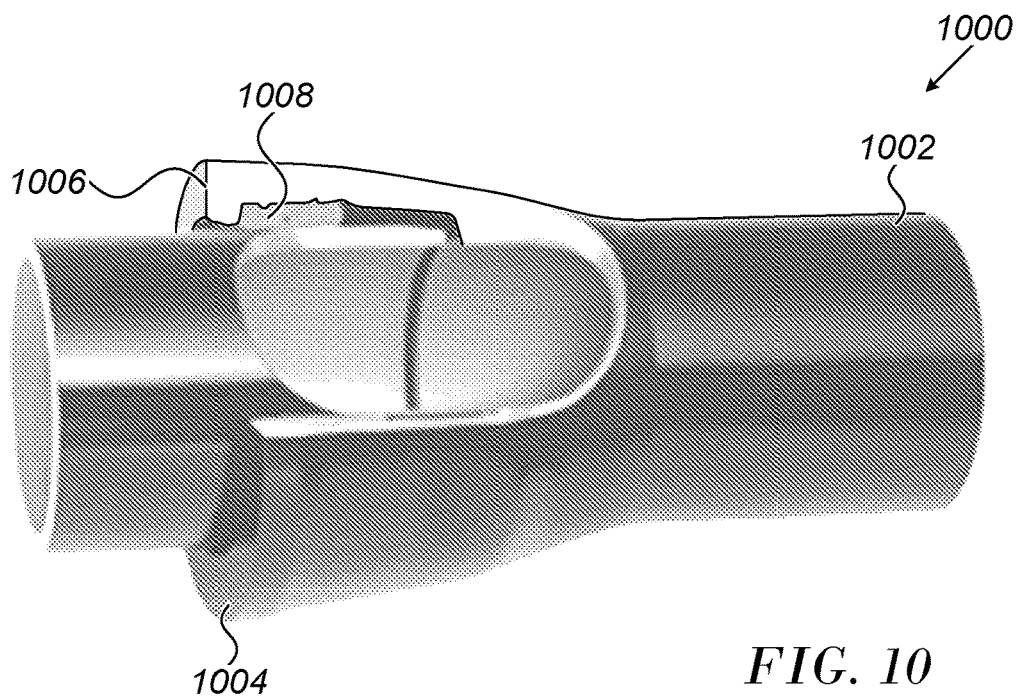
Figure 11A:
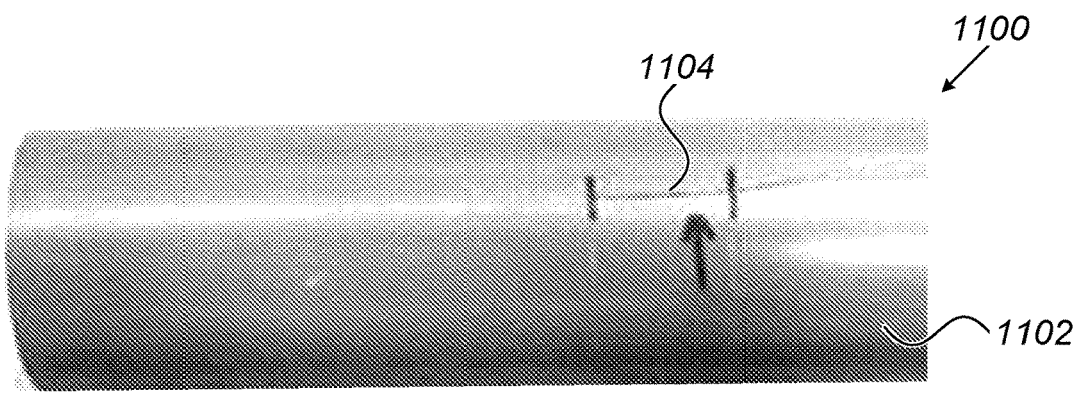
Figure 11B:
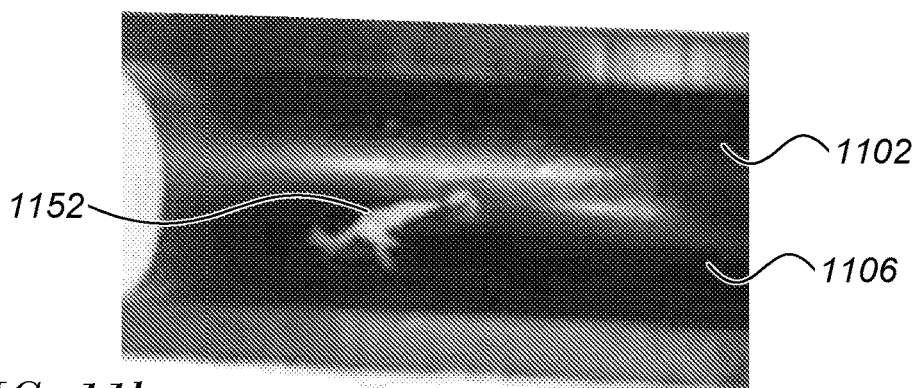

FIG. 9 is a simplified pictorial illustration of a multi-ply fiber, in accordance with an embodiment of the present invention;

FIG. 10 is a simplified pictorial illustration of a FISEC-sealed leak in a cast-iron pipe, in accordance with an embodiment of the present invention;

FIG. 11*a* is a simplified pictorial illustration of a longitudinal defect in a plastic pipe, in accordance with an embodiment of the present invention; and FIG. 11*b* is a simplified pictorial illustration of a fiber-in-sealant cure of the longitudinal defect in the plastic pipe of FIG. 11*a*, in accordance with an embodiment of the present invention.

In all the figures similar reference numerals identify similar parts.

EMBODIMENTS

1. A system for curing at one leakage site in a pipeline, the system comprising:
    a) at least one gel pig; and
    b) at least one fiber-in-sealant-in carrier fluid (FISIC) composition; wherein said at least one gel pig and said at least one FISIC composition, form a pig train, adapted to move along said pipeline to a region of said at least one leakage and to seal and cure said at least one leakage.
2. A system according to embodiment 1, wherein said at least one FISIC composition comprises:
    a. fibers;
    b. at least one sealant; and
    c. carrier fluid;
3. A system according to embodiment 1, wherein said at least one gel pig comprises two gel pigs and said at least one FISIC composition comprises one FISIC composition.
4. A system according to embodiment 1, wherein said at least one gel pig comprises three gel pigs and said at least one FISIC composition comprises two FISIC compositions.
5. A system according to embodiment 1, wherein said pig train is adapted to move along said pipeline at a speed of 0.01 to 10 m/s.
6. A system according to embodiment 2, wherein said at least one gel pig comprises one rear pig.
7. A system according to embodiment 2, where said fibers are in at least one form selected from the group consisting of: single fibers, wound fibers, yarns and combinations thereof.
8. A system according to embodiment 7, wherein said yarn is single-ply, 2-ply, 3-ply, 4-ply, 5-ply, 6-ply, 7-ply and 12-ply and combinations thereof.
9. A system according to embodiment 1, wherein said at least one gel pig comprises:
    a. a cellulosic polysaccharide;
    b. boric acid; and
    c. water.
10. A system according to embodiment 9, wherein said at least one gel pig further comprises:
    d. a metallic hydroxide.
11. A system according to embodiment 9, further comprising an oil.
12. A system according to embodiment 1, wherein said at least one gel pig comprises a rear pig and a front pig of different compositions.
13. A system according to embodiment 1, wherein said pig train is adapted to conform to an inner profile of said pipeline.
14. A system according to embodiment 13, wherein said inner profile of said pipeline is reduced in diameter in at least one section by at least 20%.
15. A system according to embodiment 14, wherein said inner profile of said pipeline is reduced in diameter in at least one section by at least 50%.
16. A system according to embodiment 15, wherein said inner profile of said pipeline is reduced in diameter in at least one section by at least 75%.
17. A system according to embodiment 13, wherein said inner profile of said pipeline is further increased in said diameter in at least one section by at least 20%.
18. A system according to embodiment 17, wherein said inner profile of said pipeline is increased in said diameter in at least one section by at least 50%.
19. A system according to embodiment 15, wherein said inner profile of said pipeline is increased in said diameter in at least one section by at least 75%.
20. A system according to embodiment 1, wherein said system further comprises a pressurized fluid for propelling said system from a first end thereof along said pipeline.
21. A system according to embodiment 1, wherein said pressurized fluid comprises a liquid.
22. A system according to embodiment 1, wherein said pressurized fluid comprises a gas.
23. A system according to embodiment 1, wherein said pressurized fluid comprises a tri-phase fluid.
24. A system according to embodiment 1, wherein said pressurized fluid is at a pressure of 1-150 bar.
25. A system according to embodiment 17, wherein said pig train is adapted to prevent a bypass of a propelling product by of more than 30%.
26. A system according to embodiment 1, wherein said pig train is adapted to be extracted from said pipeline via a conduit of less than two inch diameter at a pressure of less than 3 bar.
27. A system according to embodiment 20, wherein said system further comprises a counter pressurized fluid for counter-pressurizing said pig train from a second end thereof.
28. A system according to embodiment 27, wherein said counter pressurized fluid is for controlling velocity of movement of said pig train along said pipeline.
29. A system according to embodiment 20, wherein said pig train can be launched from a pipe of a diameter of less than 75% of said pipeline.
30. A system according to embodiment 29, wherein said pig train can be launched from a pipe of a diameter of less than 50% of said pipeline.
31. A system according to embodiment 30, wherein said pig train can be launched from a pipe of a diameter of less than 75% of said pipeline.

32. A system according to embodiment 20, wherein said pig train can be launched from a pipe at an angle of greater than 30° to said pipeline.

33. A system according to embodiment 32, wherein said pig train can be launched from a pipe at an angle of greater than 60° to said pipeline.

34. A system according to embodiment 33, wherein said pig train can be launched from a pipe at an angle of greater than 80° to said pipeline.

35. A system according to embodiment 20, wherein said pig train can be launched from a pipe at a pressure in the range of 2-15 bar.

36. A system according to embodiment 20, wherein said pig train can be launched from a pipe at a pressure of 2-4 bar.

37. A system according to embodiment 1, wherein said pig train is adapted to travel through an obstruction in said pipeline and to be operative thereafter.

38. A system according to embodiment 37, wherein said obstruction selected from the group consisting of a tuberculation, encrustation, butterfly valve, a wedge, a nail, a screw, an obstructing element, an in-pipe meter, a service pipe ferrule, a baffle, a broomstick seal and combinations thereof.

39. A system according to embodiment 1, wherein said pig train is adapted to be introduced to said pipeline from a fire hydrant, from a manhole, vertical, lateral pipe, communication pipe or from a branch pipe.

DETAILED DESCRIPTION OF THE EMBODIMENTS

In the detailed description, numerous specific details are set forth in order to provide a thorough understanding of the invention. However, it will be understood by those skilled in the art that these are specific embodiments and that the present invention may be practiced also in different ways that embody the characterizing features of the invention as described and claimed herein.

Figure 1A:
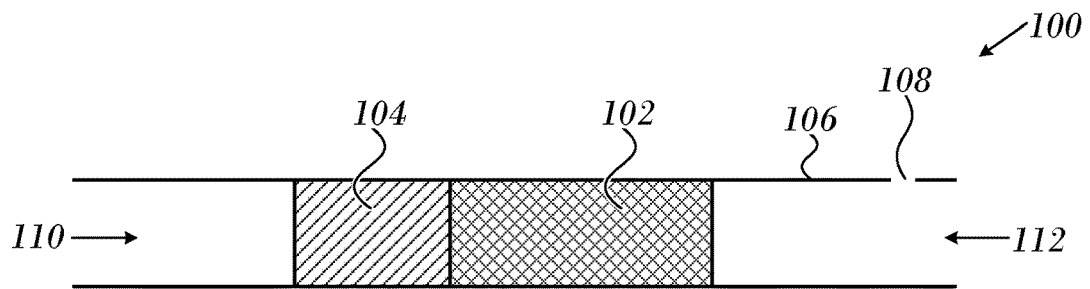

Reference is now made to FIG. 1A, which is a simplified pictorial illustration showing a system 100 for sealing a pipeline, in accordance with an embodiment of the present invention.

System 100 is constructed and configured to seal a pipeline 106 comprising at least one leakage site 108, such as a crack or hole.

By "seal" or "sealing", is meant stopping flow from a leakage site, such as a crack or hole.

By "cure" or "curing" is meant permanently preventing flow from a leakage site, such as a crack or hole, enduring pressure, temperature and other environmental changes for extensive periods of time. The cure may last one or more years, one or more decades or longer.

System 100 comprises a sealant composition comprising fibers in a carrier fluid 102 (termed herein fibers-in-sealant-in-carrier (FISIC) composition, per fibers-in-sealant composition (FISIC) 819, FIG. 8 hereinbelow) and at least one gel pig 104. System 100 is adapted to travel along the pipeline using a first pressure force 110 to the rear of the gel pig and a counter force 112 upstream (lesser than force 110). Some non-limiting examples of the gel pig compositions appear in the examples hereinbelow. Some non-limiting examples of the sealant compositions are hereinbelow in table 4.

A non-limiting example of fibers-in-sealant-in-carrier (FISIC) composition 102 is:
 a) fibers of different sizes;
 b) at least one sealant; and
 c) a carrier fluid.

Another non-limiting example of fibers-in-sealant-in-carrier (FISIC) composition 102 is:
 a) fibers of different sizes;
 b) a carrier fluid composition comprising at least one hardener and at least one resin; and
 c) water.

Another non-limiting example of fibers-in-sealant-in carrier fluid (FISIC) composition 102 is:
 a) fibers of different sizes;
 b) Silica
 c) at least one hardener;
 d) at least one resin; and
 e) carrier fluid.

Additionally, according to an embodiment of the present invention, the at least one gel pig 104 includes;
 a. a cellulosic polysaccharide;
 b. an acid;
 c. a base; and
 d. water.

Additionally, according to an embodiment of the present invention, the at least one gel pig includes;
 a. a cellulosic polysaccharide;
 b. boric acid;
 c. a base; and
 d. water.

Additionally or alternatively, according to an embodiment of the present invention, the at least one gel pig includes;
 a. hydroxypropyl guar gum;
 b. boric acid;
 c. a base; and
 d. water.

Additionally, according to an embodiment of the present invention, the at least one gel pig includes;
 a. hydroxypropyl guar gum;
 b. boric acid;
 c. sodium hydroxide; and
 d. water.

Additionally, according to an embodiment of the present invention, the at least one gel pig includes;
 a. 1-5% weight hydroxypropyl guar gum;
 b. 0.1-6% weight boric acid;
 c. 0.1-4% weight sodium hydroxide; and
 d. 70-99.5% weight water.

Additionally, according to an embodiment of the present invention, the at least one gel pig includes;
 a. 1-4% weight hydroxypropyl guar gum;
 b. 0.1-5% weight boric acid;
 c. 0.1-3% weight sodium hydroxide; and
 d. 70-99.5% weight water.

Some examples of the sealant compositions are provided in the following examples.

The natural fibers may comprise fibers of a plant, animal, mineral, petrochemical origin and combinations thereof.

The fibers collected from the seeds of various plants are known as seed fibers. Fibers collected from the cells of a leaf are known as leaf fibers, such as ex.-pina, banana, etc.

Bast fibers are collected from the outer cell layers of the plant's stem. These fibers are used for durable yarn, fabric, packaging, and paper. Some non-limiting examples are flax, jute, kenaf, industrial hemp, ramie, rattan and vine fibers.

Fibers may be collected from the fruit of the plant, e.g. coconut fiber (coir) from the stalks of plants, e.g. straws of wheat, rice, barley, bamboo and straw.

Plant fibers are often rich in cellulose and they are a cheap, easily renewable source of fibers with the potential for polymer reinforcement. The presence of surface impurities and the large amount of hydroxyl groups make plant fibers less attractive for reinforcement of polymeric materials. Hemp, sisal, jute, and kapok fibers may be subjected to alkalization by using sodium hydroxide.

The nanofibers are bundles of cellulose fibers of widths, typically ranging between 30 and 100 nm and estimated lengths of several micrometers. The chemical analysis showed that selective chemical treatments increased the $\alpha$-cellulose content of hemp nanofibers from 75 to 94%.

Natural fibers may include one or more of hemp, jute, flax cotton, soft wood, Ramie, Sisal and Bamboo.

Typically, the natural fibers are received as a long yarn. The long yarn may be one-ply, two-ply, three-ply, four-ply or any number of ply or combinations thereof. The long yarns are cut in a cutting step to be of easily manageable dimensions. For example, they may be prepared to be 8.5 mm and 1-ply. The cut fibers may be stored in a storing step before use.

In one non-limiting example, hemp yarn has a size of nm 10 (Nm 10 yarn=10,000 meters per kilogram, or about 4,960 yards per pound) from single to multiple plies of 1, 2, 3, 4, 5, 6, 7 and 12 in either natural or bleached (using peroxide) Made from earth-friendly wet spun hemp, these yarns are smooth and durable.

The hemp fibers may be, for example, the following types: NM8.5/1 (count 8.5 with 1 ply), NM8.5/3 (count 8.5 with 3 ply), NM8.5/5 (count 8.5 with 5 ply) and NM8.5/7 (count 8.5 with 7 ply) 100% hemp long fiber yarn ringspun/ bleached. eco-friendly, anti-bacteria, anti-UV and moisture-absorbent.

The yarns may be provided on spools or in packages and may be single-ply, 2-ply, 3-ply, 4-ply, 5-ply, 6-ply, 7-ply and 12-ply or combinations thereof. In some cases, the following types are used: NM8.5/1 (count 8.5 with 1 ply), NM8.5/3 (count 8.5 with 3 ply), NM8.5/5 (count 8.5 with 5 ply) and NM8.5/7 (count 8.5 with 7 ply) long fiber yarn ringspun/OE bleached, eco-friendly, anti-bacterial, anti-UV and moisture-absorbent 100% hemp.

According to other embodiments, the fibers may be selected from of a plant, animal, mineral, petrochemical origin and combinations thereof.

The fibers collected from the seeds of various plants are known as seed fibers. Fibers may be collected from the cells of a leaf, which are known as leaf fibers, such as ex.-pina, banana, etc.

Bast fibers are collected from the outer cell layers of the plant's stem. These fibers are used for durable yarn, fabric, packaging, and paper. Some examples are flax, jute, kenaf, industrial hemp, ramie, rattan and vine fibers.

Fibers collected from the fruit of the plant, e.g. coconut fiber (coir) from the stalks of plants, e.g. straws of wheat, rice, barley, bamboo and straw.

Plant fibers are rich in cellulose and they are a cheap, easily renewable source of fibers with the potential for polymer reinforcement. The presence of surface impurities and the large amount of hydroxyl groups make plant fibers less attractive for reinforcement of polymeric materials. Hemp, sisal, jute, and kapok fibers may be subjected to alkalization by using sodium hydroxide (Mwaikambo et al., 2002).

The nanofibers are bundles of cellulose fibers of widths ranging between 30 and 100 nm and estimated lengths of several micrometers. The chemical analysis showed that selective chemical treatments increased the a-cellulose content of hemp nanofibers from 75 to 94% (Wang et al., 2007).

Bogoeva-Gaceva et al., 2007 compare the natural properties of various natural fibers, such as hemp, jute, flax cotton, soft wood, Ramie, Sisal and Bamboo. Typical properties include density, elongation at break, fracture stress and Young's modulus.

Another non-limiting example of fibers-in-sealant-in carrier fluid (FISIC) composition 102 is:
  a) plant fibers of different sizes;
  b) silica;
  c) at least one sealant; and
  d) carrier fluid.

Another non-limiting example of FISIC composition 102 is:
  a) hemp plant fibers of different sizes;
  b) silica;
  c) at least one sealant; and
  d) a carrier fluid.

A non-limiting example of a gel-pig(s) composition 104 is:
  a) At least one organic or inorganic filler, selected from carbon ash, aluminum hydroxide, calcium carbonate, calcium hydroxide, magnesium hydroxide, magnesium carbonate, titanium hydroxide, silica, similar fillers and combinations thereof in a weight ratio of 0.01-3% wt/wt.
  b) At least one gelling agent selected from carrageenan, agar agar, hydroxymethylcelluose, hydroxyethyl cellulose, hydroxypropyl cellulose and combinations thereof in a weight ratio of 0 to 20% wt/wt.
  c) A coloring agent selected from a water soluble dye, a water insoluble dye, a paint, an oxide, a metal oxide and combinations thereof in a weight ratio of 0 to 1% wt/wt.
  d) At least one surfactant selected from an ionic surfactant, an anionic surfactant, a detergent, an edible oil, an inedible oil and combinations thereof in a weight ratio of 0.01 to 10% wt/wt.
  e) At least one aqueous agent selected from sea water, tap water, distilled water, ice and combinations thereof in a weight ratio of 20 to 90% wt/wt.

The fibers may be single fibers, wound fibers, yarns or combinations thereof.

Figure 1B:
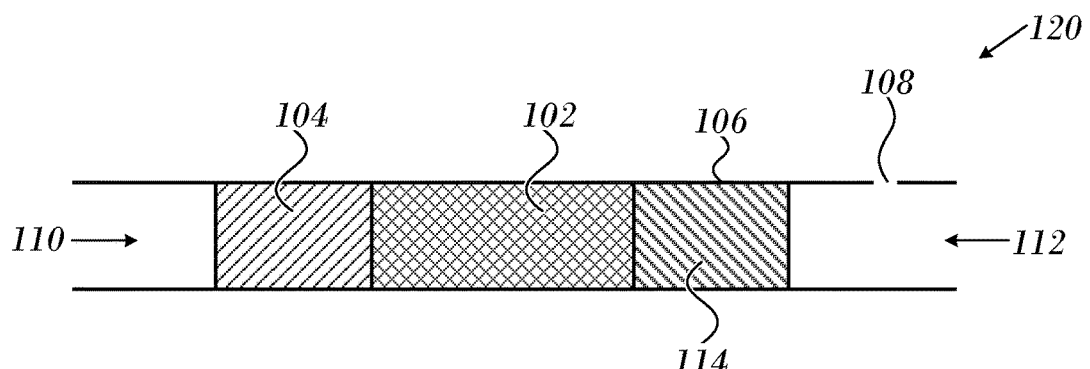

FIG. 1B shows a simplified pictorial illustration showing another system 120 for sealing a pipeline, in accordance with an embodiment of the present invention. System 120 comprises two gel pigs 104, 114. These gel pigs may be of identical or different compositions. These are termed herein a rear gel pig 104 and a front gel pig 114. Dispersed between the two gel pigs is fiber-in-sealant-in-carrier fluid (FISIC) composition 102. Some non-limiting examples of the fiber-in-liquid (FISIC) compositions appear in the examples hereinbelow and are further described with respect to FIG. 8.

Figure 1C:
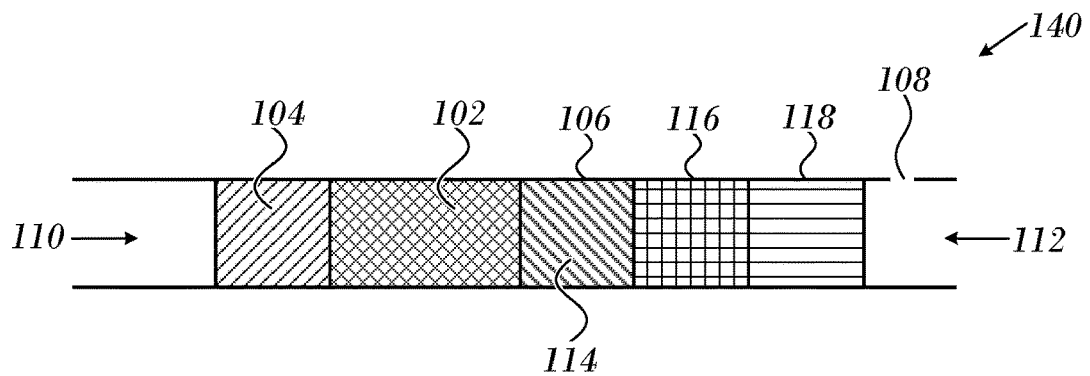

There can be seen in FIG. 1C a simplified pictorial illustration showing another system 140 for sealing a pipeline, in accordance with an embodiment of the present invention. System 140 comprises three gel pigs 104, 114, 118 and two FISIC compositions 102, 116. These gel pigs may be of identical or different compositions. Likewise, FISIC compositions 102, 116 may be identical or different. Some non-limiting examples of the gel pig compositions appear in the examples hereinbelow and with respect to FIG. 8 hereinbelow.

A non-limiting example of composition 114 is:
a) At least one organic or inorganic filler selected from carbon ash, aluminum hydroxide, calcium carbonate, calcium hydroxide, magnesium hydroxide, magnesium carbonate, titanium hydroxide, silica, similar fillers and combinations thereof in a weight ratio of 0.01-10% wt/wt.
b) At least one gelling agent selected from carrageenan, agar agar, hydroxymethylcelluose, hydroxyethyl cellulose, hydroxypropyl cellulose and combinations thereof in a weight ratio of 0 to 30% wt/wt.
c) A coloring agent selected from a water soluble dye, a water insoluble dye, a paint, an oxide, a metal oxide and combinations thereof in a weight ratio of 0 to 1% wt/wt.
d) At least one surfactant selected from an ionic surfactant, an anionic surfactant, a detergent, an edible oil, an inedible oil and combinations thereof in a weight ratio of 0.0 to 20% wt/wt.
e) At least one aqueous agent selected from sea water, tap water, distilled water, ice and combinations thereof in a weight ratio of 20 to 99.5% wt/wt.

A non-limiting example of composition 118 is:
a) At least one organic or inorganic filler selected from carbon ash, aluminum hydroxide, calcium carbonate, calcium hydroxide, magnesium hydroxide, magnesium carbonate, titanium hydroxide, silica, similar fillers and combinations thereof in a weight ratio of 0.01-10% wt/wt.
b) At least one gelling agent selected from carrageenan, agar agar, hydroxymethylcelluose, hydroxyethyl cellulose, hydroxypropyl cellulose and combinations thereof in a weight ratio of 0 to 30% wt/wt.
c) A coloring agent selected from a water soluble dye, a water insoluble dye, a paint, an oxide, a metal oxide and combinations thereof in a weight ratio of 0 to 1% wt/wt.
d) At least one surfactant selected from an ionic surfactant, an anionic surfactant, a detergent, an edible oil, an inedible oil and combinations thereof in a weight ratio of 0.01 to 20% wt/wt.
e) At least one aqueous agent selected from sea water, tap water, distilled water, ice and combinations thereof in a weight ratio of 20 to 99.5% wt/wt.

Figure 1D:
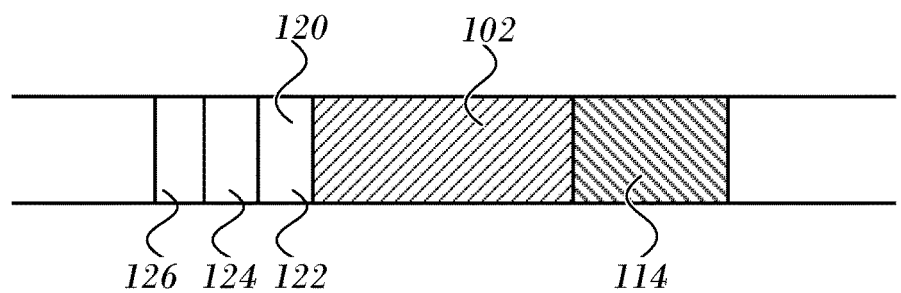

FIG. 1D is a simplified pictorial illustration showing another system 160 for sealing a pipeline, in accordance with an embodiment of the present invention. System 160 comprises two gel pigs 114, 120 and a FISIC composition 102 or 116 disposed therebetween. The front gel pig 114 may be similar or identical to those described herein. The rear gel pig 120 comprises at least two or three different compositions 122, 124, 126, for introduction into a pipeline sequentially (first 122, then 124 and thereafter 126).

A non-limiting example of composition 122 or composition 124 or composition 126 is:
a) At least one organic or inorganic filler selected from carbon ash, aluminum hydroxide, calcium carbonate, calcium hydroxide, magnesium hydroxide, magnesium carbonate, titanium hydroxide, silica, similar fillers and combinations thereof in a weight ratio of 0.0-3% wt/wt.
b) At least one gelling agent selected from carrageenan, agar agar, hydroxymethylcelluose, hydroxyethyl cellulose, hydroxypropyl cellulose and combinations thereof in a weight ratio of 0 to 20% wt/wt.
c) A coloring agent selected from a water soluble dye, a water insoluble dye, a paint, an oxide, a metal oxide and combinations thereof in a weight ratio of 0 to 1% wt/wt.
d) At least one surfactant selected from an ionic surfactant, an anionic surfactant, a detergent, an edible oil, an inedible oil and combinations thereof in a weight ratio of 0.01 to 10% wt/wt.
e) At least one aqueous agent selected from sea water, tap water, distilled water, ice and combinations thereof in a weight ratio of 20 to 99.5% wt/wt.

Additionally or alternatively, the rear gel pig comprises four compositions, five compositions, six compositions, seven compositions, eight compositions or another multiplicity of compositions. A fourth composition 128 (not shown), a fifth composition 130 (not shown), a sixth composition 132 (not shown).

When six compositions are applied the first composition (front to back) serves as a separator between the sealing composition and the second composition. It has a density of 1.0-1.5 g/cm$^3$. The second composition, together with the third composition, forms a two (horizontal) layer sealant body preventing the bypass of the liquid propellant. The second composition has a density of 0.9-1.5 g/cm$^3$ and the third composition has a density of 0.8-1.2 g/cm$^3$. The fourth and fifth compositions isolate the third composition from the propelling liquid. Respective densities are 1.0-1.8 g/cm$^3$ and 0.8-1.2 g/cm$^3$. The sixth composition is a gel sealant, whose purpose is to temporarily seal the pig train from the rear upon launch. It has a density of 0.8-1.2 g/cm$^3$.

Figure 2:
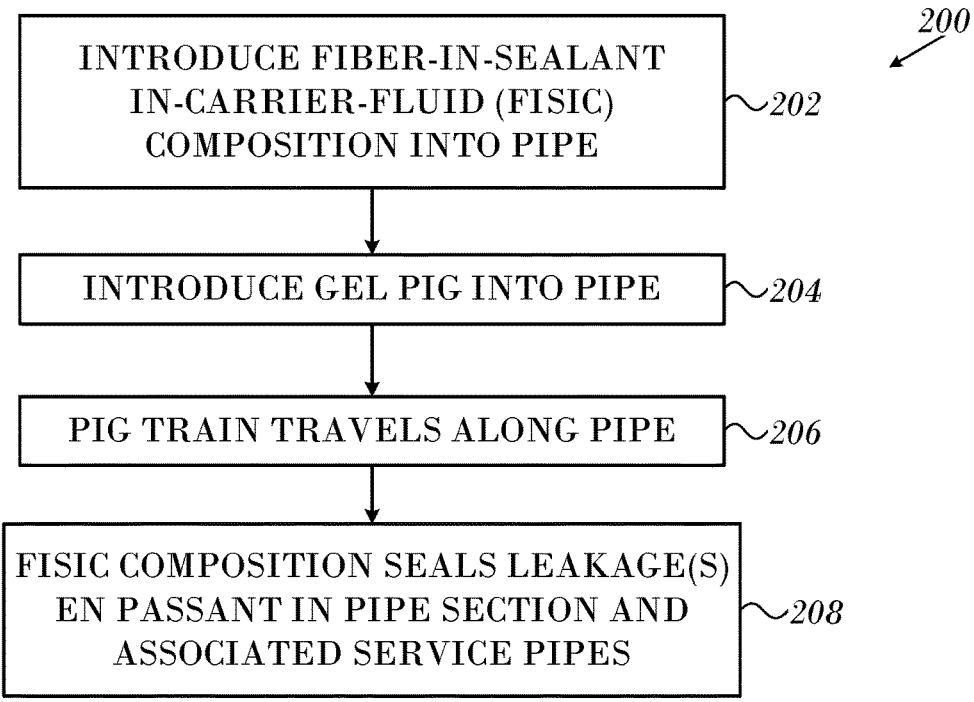

Reference is now made to FIG. 2, which is a simplified flow chart of a method 200 for sealing a pipeline, in accordance with an embodiment of the present invention, with reference to FIG. 1A. A sealant composition, such as FISIC composition 102 is introduced to pipeline 106 in a (FISIC) composition introducing step 202. This may be performed from one end of the pipe or from a manhole or vertical.

Thereafter, gel pig 104 is introduced from the same end of the pipe as the sealant composition or from a manhole or vertical, in a gel pig composition introducing step 202.

The combination of the FISIC composition 102 and gel pig 104 is termed herein a "pig train". The pig train travels along the pipe in a travelling step 206 to site 108 of the leakage. The sealant composition within the FISIC operative to seal the leakage in a sealing step 208. It typically takes a few minutes to several hours until the seal is fully cured.

Typically, gel pig 104 is of approximately the same diameter as the inner diameter of the pipe and is typically 0.5-10 diameters in length. The physical properties of the gel pig appear in Table 4.

The pipeline may comprise one or more pipes or mains pipes, one or more laterals and one or more secondary laterals. The pipeline is shown as a straight pipe for the sake of simplicity and should not be deemed as limiting. The pipeline may further comprise valves, meters, joints, welds etc. These are not shown for the sake of simplicity.

Figure 3:
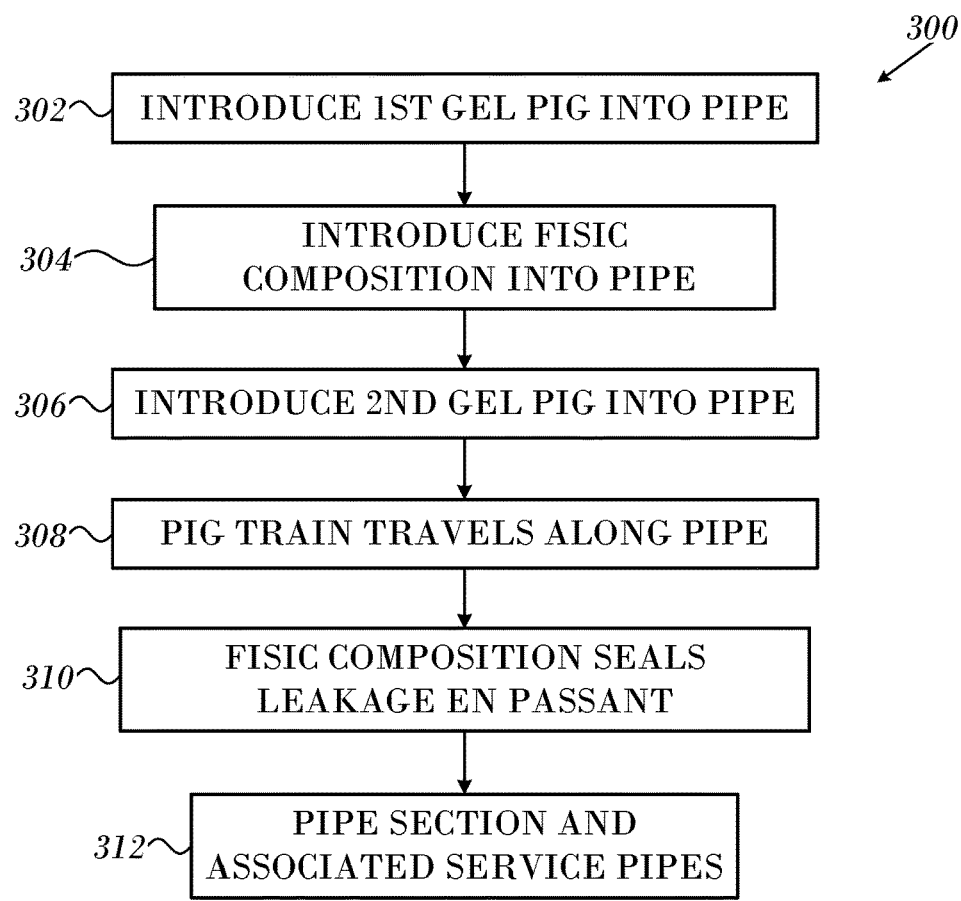

Reference is now made to FIG. 3, which is a simplified flow chart of another method 300 for sealing a pipeline, in accordance with an embodiment of the present invention, with reference to FIG. 1.

A first gel pig 114 is introduced to the pipe in an optional introducing pig step 302. The fiber-in-liquid pig may be introduced from a fire hydrant, from a manhole, vertical, lateral pipe, communications pipe or from a branch pipe.

A fiber-in-sealant-in carrier fluid (FISIC) composition, such as FISIC composition 102 is introduced to pipeline 106, from a fire hydrant, from a manhole, vertical, lateral pipe, communication pipe or from a branch pipe, in a FISIC composition introducing step 304. This may be performed from one end of the pipe or from a manhole or vertical.

Thereafter, a second gel pig 104 is introduced from the same end of the pipe, from a fire hydrant, from a manhole, vertical, lateral pipe, communication pipe or from a branch pipe, as the FISIC composition or from a manhole or vertical, in a second gel pig composition introducing step 306.

The combination of the FISIC composition 102 and gel pigs 114, 104 is termed herein a "pig train". The pig train travels along the pipe in a travelling step 308 to site 108 of the leakage. The sealant composition in the FISIC is operative to seal the leakage in a sealing step 310. It typically takes a few minutes to several hours until the seal is fully cured.

Typically, gel pigs 104, 114 are of approximately the same diameter as the inner diameter of the pipe and is typically 0.5-10 diameters in length. The physical properties of the front gel pig 114 appear in Table 3.

The pig train is typically recovered from the pipeline in an exit pipe step 312.

Figure 4:
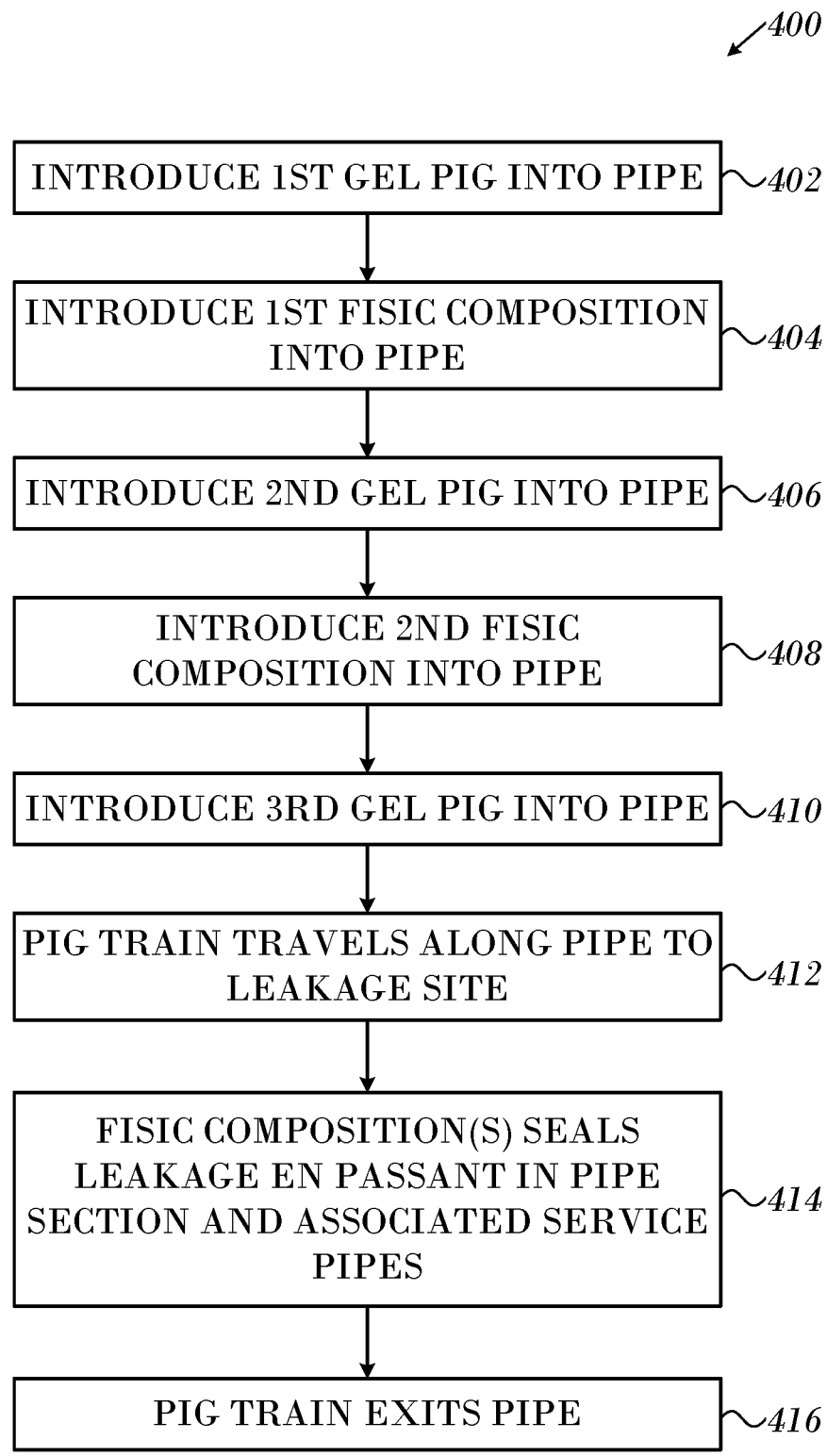

FIG. 4 is a simplified flow chart of another method 400 for sealing a pipeline, in accordance with an embodiment of the present invention, with reference to FIG. 1C.

A first gel pig 118 is introduced to the pipe in an optional first introducing pig step 402. The first gel pig 118 may be introduced from a fire hydrant, from a manhole, vertical, lateral pipe, communication pipe or from a branch pipe.

A FISIC composition 116 is introduced to pipeline 106 in a first sealant composition introducing step 404. This may be performed from one end of the pipe or from a manhole from a fire hydrant, lateral pipe, communication pipe or from a branch pipe or vertical.

Thereafter, a second gel pig 114 is introduced from the same end of the pipe as the first FISIC composition or from a fire hydrant, from a manhole, vertical, lateral pipe, communication pipe or from a manhole or vertical, in a second gel pig composition introducing step 406.

A second FISIC composition 102 is introduced to pipeline 106 from a fire hydrant, from a manhole, vertical, lateral pipe, communication pipe or from a branch pipe in a second FISIC composition introducing step 408. This may be performed from one end of the pipe or from a manhole or vertical.

Thereafter, a third gel pig 104 is introduced from the same end of the pipe as the first and second FISIC composition from a fire hydrant, from a manhole, vertical, lateral pipe, communication pipe or from a branch or from a manhole or vertical, in a third gel pig composition introducing step 410.

The combination of the FISIC compositions 102, 116 and gel pigs 118, 114 and 104 is termed herein a "pig train". The pig train travels along the pipe in a travelling step 412 to site 108 of the leakage. The FISIC composition(s) is/are operative to seal the leakage in a sealing step 414. It typically takes a few minutes to several hours until the seal is fully cured.

Typically, gel pigs 104, 114, 118 are of approximately the same diameter as the inner diameter of the pipe and is typically 0.5-10 diameters in length. The physical properties of the front/middle gel pig 118/114 appear in Table 3.

The pig train is typically recovered from the pipeline in an exit pipe step 416. In some cases, one or more of the gel pigs may be replaced with a polymer pig, such as polyurethane.

Figure 5:
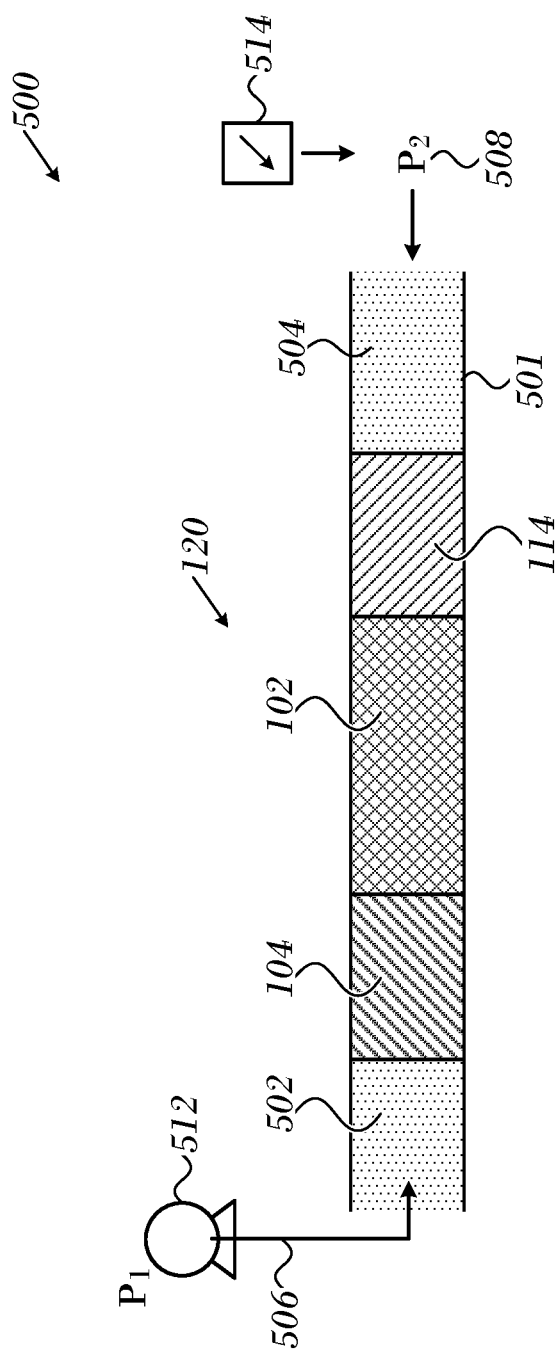

Reference is now made to FIG. 5, which is a simplified pictorial illustration showing a system 500 for sealing a pipeline, in accordance with an embodiment of the present invention.

System 500 comprises an optional front gel pig 114 and at least one real gel pig 104. A FISIC composition 102 is disposed between pigs 114 and 104, forming a pig train 120. A fluid 502 is inserted into a pipeline 501, from a fire hydrant, from a manhole, vertical, lateral pipe, communication pipe or from a branch pipe, and a first pressure $P_1$ 506 is applied to fluid 502. Additionally a second counter-pressure $P_2$, 508 is applied to a second fluid 504. Typically $P_1$ is much greater than $P_2$. The average velocity of pig train 120 is determined by the fluid properties and a pressure difference $(P_1-P_2)$. In some cases, front gel pig is not present.

Pressure P1 is introduced by a pump 512, pressure from an existing network or any other suitable pressure introducing means, known in the art. The pressure P1 is typically regulated by control means, as are known in the art.

Pressure P2 may be introduced by any suitable passive means, such as a pressure relief valve 514, a discharge valve, a pressure regulator or the like.

The gel pigs of the present invention provide the following advantages:

1) Gel pigs are adapted to multi-dimensioned pipes—adaption to variable and changing diameters in situ.
2) Non-abrasive very non-abrasive (in contrast to poly pigs, which may get stuck in a pipeline, induce a reddening of water, induce a change of pH of the water, or may abrade tubicles.
3) Gel pigs of the present invention are to introduce into pipe and to remove from pips providing system flexibility.
4) Gel pigs of the present invention do not normally get stuck in the pipe (better than polymer (solid) pigs and due to their fluidity, can always be flushed out.
5) The rear pig does not compromise/dislodge disengage newly formed seals, in contrast to solid pigs.
6) Gel pigs of the present invention are fully flushable (in contrast, solid pigs leave debris).
7) A front pig of the present invention allows water to bypass and overtake-allows escape route to prevent/minimize fiber-in-sealant composition dilution.
8) In a two pig system, the rear pig acts differently to the front pig.
9) Pig receiver/retriever for solid pigs is not required for gel pigs.
10) The gel pigs of the present invention are biodegradable.
11) Gel pigs of the present invention require reduced transportation costs—here can be formulated at/near the site of use. Saving on transport costs.

EXAMPLE 1

In this example, the values percent of the compositions A and B per FIG. 8 hereinbelow, and exemplary weight concentration ranges are provided.

Composition of Material A (%):
Bisphenol A 50.0-70.0 (%)
Glycidyl Ether 7.0-20.0 (%)
Inert powdered filler 10.0-20.0 (%)
Clay 0-2.0 (%)
A detergent precursor 0-5.0 (%)
A corrosion resistance provider 0-3.0 (%)
Hydrophobic liquid filler 2.0-5.0 (%)

Inert liquid filler 4.0-7.0 (%)
Silicon dioxide 0.5-1.0 (%)
Iron oxide hydroxyl 0.1-0.5 (%)
Composition of Material B (%):
Diethylene thiamine 0-23.0 (%)
4.4-isopropylidenediphenol 0-16.0 (%)
Isophorondiamine 0-31.0 (%)
Benzyl alcohol 0-31.0 (%)
A surfactant 0-1.0 (%)
Detergent precursor 0-5.0 (%)
Inert powdered filler 5-15.0 (%)
Polyoxypropylene thiamine 0-70.0 (%)
A corrosion resistance provider 0-5.0 (%)
Clay 0-4.0 (%)
4-nonylphenol, branched 0-15.0 (%)
Silicon dioxide 0.2-2.0 (%)
Iron oxide hydroxyl 0-0.6 (%)
Inert liquid filler 1-6.0 (%)
Hydrophobic liquid filler 1.0-6.0 (%)

These materials once cured serve to provide robust long term plugging of the leakage with a longevity of similar order of magnitude to the remaining useful life of the host pipe. They also serve to withstand changing environmental conditions. The cured product having a similar thermal coefficient in order of magnitude to the host pipe typically expands and contracts under changing temperatures in unison with the host pipe so as not to create a secondary leak under these conditions.

EXAMPLE 2

This example shows the composition of the sealant plug covering the hole in the pipe and the pipe remains in the field of repair of.

| CAS # | Name component material | Content, % |
|---|---|---|
| 80-05-7 | Bisphenol A | 39 |
| 668609-97-2 | Glycidyl ether | 11 |
| 21645-51-2 | Inert powder filler (synthetic aluminum | 20 |
| 67-53-0 | A corrosion resistance provider | 3 |
| 120962-03 | Rapeseed oil | 6.1 |
| 112945-52 | Silicon dioxide | 1 |
| 20344-49 | Iron oxide hydroxyl | 0.3 |
| 1140-40-0 | Diethylene thiamine | 3.5 |
| 80-05-74.4 | Isopropylidenediphenol | 2.5 |
| 2855-13-2 | Isophorondiamine | 4 |
| 100-51-6 | Benzyl alcohol | 4 |
| 9009-54-5 | Polyurethane | 2 |
| 9003-04-7 | Polyacrylate (Tamcril-15) | 3 |
| 9004-62-9 | Berol NP-10 (9) | 0.4 |
| 9004-62-0 | Hydroxyethyl cellulose | 0.1 |
| 8050-81-5 | Antifoam APRU DF-7010 | 0.1 |

EXAMPLE 3

A gel pig is formed according to the following method.
1) Chemical constituents were obtained in accordance with table 1A.
2) A gel pig mixture was made by mixing the components of table 1A in a stirred vessel for several (1-30) minutes at ambient temperature and pressure.
3) The resultant gel formed was stored in a closed container in the dark for 0-60 days at room temperature before use.

The front and/or rear gel pigs may comprise any combination of components as appear in Tables 1A-1C hereinbelow.

TABLE 1A

Chemical composition of gel pig

| Functional Component | Example Constituent | Weight percent [%] |
|---|---|---|
| Hygroscopic component | Cellulose, Hydroxyethyl Cellulose, Ethyl hydroxyethyl cellulose, gum, gelatin or other | 1-12 |
| Surfactant | Oil or other | 0-8 |
| Base | Aluminum hydroxide | 0-20 |
| Particulate | Silica | 0-2 |
| fluid | Water | 70-99.5 |
| | Total | 100 |

TABLE 1B

Chemical composition of gel pig

| Functional Component | Example Constituent | Weight percent [%] |
|---|---|---|
| Hygroscopic component | Cellulose, gum, gelatin or other | 1-10 |
| Surfactant | Oil or other | 0-8 |
| Base | Aluminum hydroxide | 0-20 |
| Cross-linker | Boric acid | 0-5% |
| Particulate | Silica | 0-2 |
| fluid | Water | 70-99 |
| | Total | 100 |

Another non-limiting example of composition of a gel pig is in accordance with the composition in table 1C below:

TABLE 1C

Exemplary composition of a front or rear gel pig

| Constituent | Constituent % Range weight % | CAS Numbers | Molarity |
|---|---|---|---|
| Hydroxypropyl Guar Gum/ Guar Gum | 1-5 | 39421-75-5 | — |
| Alcohol, Ethanol or Propanol (50%-100%) | 1-8 | 64-17-5, 71-23-8 | Ethanol 15.2 molar; Propanol 11.7 molar |
| Sodium hydroxide | 0.1-4 | 1310-73-2 | 0.4% w/w |
| Boric Acid | 0.1-6 | 10043-35-3 | 0.2-2 molar weight = 3.65% w/w |
| Water | 70-99.5 | | — |
| | 100% | | |

According to some embodiments, the physical properties of the gel pigs appear as in tables 2 and/or 3.

According to one or more embodiments, hydrophobic solvents are liquid oils originating from synthetic, vegetable, marine or animal sources. The canola oil exemplified may be replaced by any suitable liquid oil including saturated, unsaturated or polyunsaturated oils. By way of example, the unsaturated oil may be olive oil, corn oil, soybean oil, cottonseed oil, coconut oil, sesame oil, sunflower oil, borage seed oil, syzigium aromaticum oil, hempseed oil, herring oil, cod-liver oil, salmon oil, flaxseed oil, wheat germ oil, canola oil, evening primrose oils or mixtures thereof, in any proportion.

According to one or more embodiments, the silica exemplified may be replaced by a) microsponges, b) silica, c) mineral bodies like zeolite, bentonite, (iii) graphite, including polymers, dendrimers and liposomes, or mixtures thereof, in any proportion.

According to one or more embodiments, the aluminum hydroxide exemplified may be replaced by minerals such as aluminum phosphate and calcium phosphate or mixtures thereof, in any proportion.

According to one or more embodiments, the hydroxyethyl cellulose exemplified may be replaced by any at least one polymeric additive selected from the group consisting of polysaccharides, natural polysaccharides, derivatives thereof, modified poysaccharides, derivatives thereof, starch, dextrin, glycogen, cellulose and chitin, glycosaminoglycans (GAG's), chondroitin sulphate, dermatan sulphate, keratan sulphate, heparan sulphate, heparin, and hyaluronan, amylose and amylopectin, cellulose derivatives, xanthan gum, sodium CMC, methylcellulose, and hydroxyl propyl methyl cellulose or mixtures thereof, in any proportion.

Specific non limiting examples of surfactants are an ionic surfactant, a non-ionic surfactant, a hydrophobic surfactant or mixtures thereof, in any proportion.

Exemplary hygroscopic agents that can be used in accordance with one or more embodiments include, for example, naturally-occurring polymeric materials, such as locust bean gum, sodium alginate, sodium caseinate, egg albumin, gelatin agar, carrageenan gum, sodium alginate, xanthan gum, quince seed extract, tragacanth gum, guar gum, starch, chemically modified starches and the like, semi-synthetic polymeric materials such as cellulose ethers (e.g. hydroxyethyl cellulose, methyl cellulose, carboxymethyl cellulose, hydroxy propylmethyl cellulose), guar gum, hydroxypropyl guar gum, soluble starch, cationic celluloses, cationic guars, and the like, and synthetic polymeric materials, such as carboxyvinyl polymers, polyvinylpyrrolidone, polyvinyl alcohol, polyacrylic acid polymers, polymethacrylic acid polymers, polyvinyl acetate polymers, polyvinyl chloride polymers, polyvinylidene chloride polymers and the like. Mixtures of the above compounds are contemplated.

According to some further embodiments, a base may be selected from sodium hydroxide, magnesium hydroxide, aluminum hydroxide, potassium hydroxide and combinations thereof.

Alcohol Shopping List

TABLE 2

Physical and Chemical properties of rear gel pig

|  | minimum | maximum |
| --- | --- | --- |
| Viscosity cPs | 5 | 10000 |
| Density g/cm$^3$ | 0.8 | 1.2 |

TABLE 3

Physical and Chemical properties of front gel pig

|  | minimum | maximum |
| --- | --- | --- |
| Viscosity cPs | 5 | 10000 |
| Density g/cm$^3$ | 0.8 | 1.5 |

TABLE 4

Physical and Chemical properties of a fiber-in-sealant composition

|  | minimum | maximum |
| --- | --- | --- |
| Viscosity cPs | 5 | 10000 |
| Density g/cm$^3$ | 0.8 | 2 |

Figure 6:
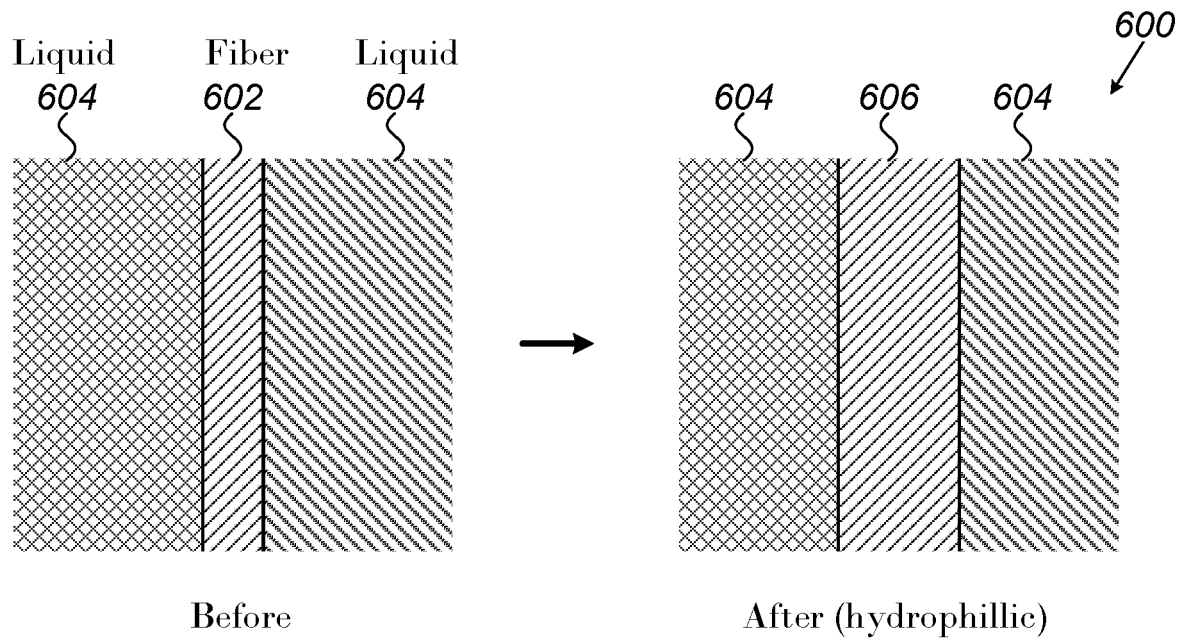

Reference is now made to FIG. 6, which is a simplified pictorial illustration of a fiber 602 before and after 606 being soaked in a liquid 604, in accordance with an embodiment of the present invention.

Figure 7:
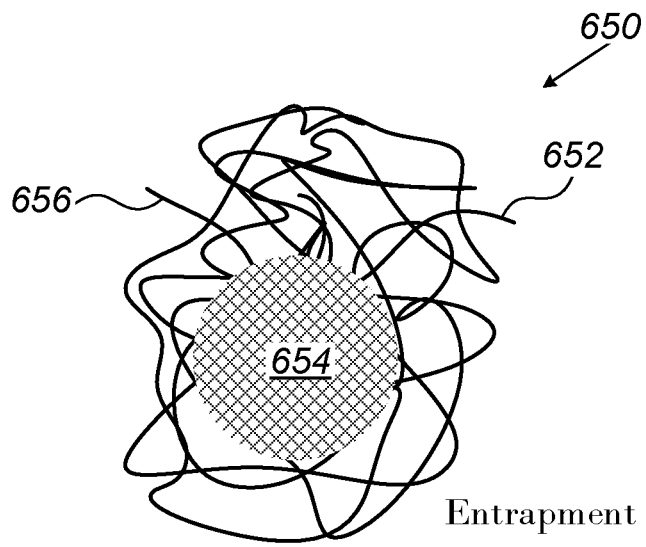

FIG. 7 is a simplified pictorial illustration of a three dimensional structure 650 of fibers 652, 656 trapping a liquid 654, in accordance with an embodiment of the present invention.

Figure 8:
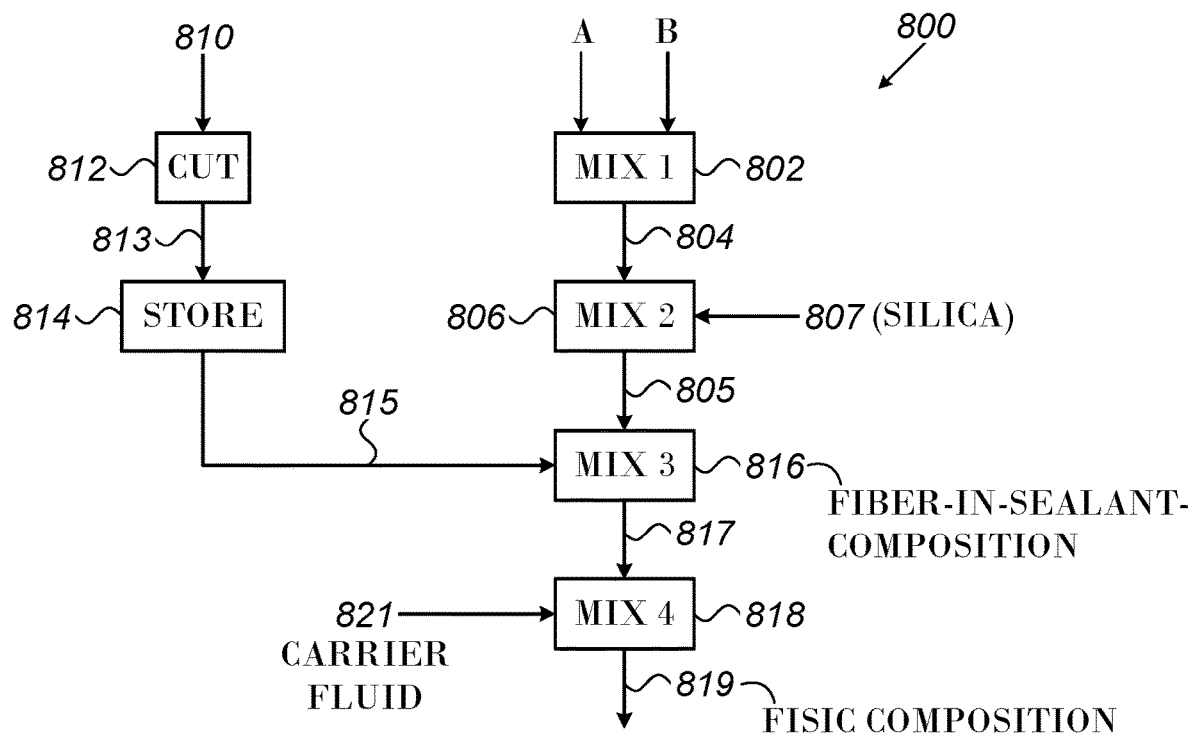

Reference is now made to FIG. 8, which shows a simplified flowchart 800 of a method for the preparation of a FISIC composition 819 in accordance with an embodiment of the present invention.

One or more natural fibers 810 are cut in a cutting step 812.

The natural fibers may comprise fibers of a plant, animal, mineral, petrochemical origin and combinations thereof.

The fibers collected from the seeds of various plants are known as seed fibers. Fibers collected from the cells of a leaf are known as leaf fibers, such as ex.-pina, banana, etc.

Bast fibers are collected from the outer cell layers of the plant's stem. These fibers are used for durable yarn, fabric, packaging, and paper. Some examples are flax, jute, kenaf, industrial hemp, ramie, rattan and vine fibers.

For example, the hemp fiber used may comprise one or more of the following: NM8.5/1 (count 8.5 with 1 ply), NM8.5/3 (count 8.5 with 3 ply), NM8.5/5 (count 8.5 with 5 ply) and NM8.5/7 (count 8.5 with 7 ply) 100% hemp long fiber yarn ringspun/OE bleached or non-bleached, eco-friendly, anti-bacteria, anti-UV and moisture-absorbent Fibers collected from the fruit of the plant, e.g. coconut fiber (coir) bers from the stalks of plants, e.g. straws of wheat, rice, barley, bamboo and straw.

Plant fibers are rich in cellulose and they are a cheap, easily renewable source of fibers with the potential for polymer reinforcement. The presence of surface impurities and the large amount of hydroxyl groups make plant fibers less attractive for reinforcement of polymeric materials. Hemp, sisal, jute, and kapok fibers were subjected to alkalization by using sodium hydroxide.

The nanofibers are bundles of cellulose fibers of widths ranging between 30 and 100 nm and estimated lengths of several micrometers. The chemical analysis showed that selective chemical treatments increased the a-cellulose content of hemp nanofibers from 75 to 94%.

Natural fibers may include one or more of hemp, jute, flax cotton, soft wood, Ramie, Sisal and Bamboo.

Typically, the natural fibers 810 are received as a long yarn. The long yarn may be one-ply, two-ply, three-ply, four-ply or any number of ply or combinations thereof. The long yarn is cut in a cutting step 812 to be of easily manageable dimensions, for example, 8.5 mm and 1-ply. The cut fibers 813 may be stored in a storing step 814 before use.

In one non-limiting example, hemp yarn has a size of nm 10 (nm 10 yarn=10,000 meters per kilogram, or about 4,960 yards per pound) from single to multiple plies of 1, 2, 3,4, 5, 6, 7 and 12 in either natural or bleached (using peroxide) Made from earth-friendly wet spun hemp, these yarns are smooth and durable The yarns may be provided on spools or in packages and may be single-ply, 2-ply, 3-ply, 4-ply, 5-ply, 6-ply, 7-ply and 12-ply or combinations thereof.

According to some embodiments of the present invention, composition A comprises hardener (CAS Nos. Diethylenetriamine 1140-40-0, Bisphenol A 80-05-7, Isophorondiamine 2855-13-2, and Benzyl alcohol 100-51-6)-see tables 5 and 6.

According to some embodiments of the present invention, composition B comprises Epoxy resin (35068-38-6 Phenol-Formaldehyde Polymer Glycidyl Ether and 68609-97-2 Alkyl (C12-C14) glycidyl ether) and acts as a resinous composition.

According to some embodiments of the present invention, first composition A and a second composition B are mixed in a first mixing step 802.

TABLE 5

| ingredients in composition A | | |
|---|---|---|
| | WEIGHT PERCENT % | CAS NO. |
| Diethylenetriamine | 10-50 | 1140-40-0 |
| Bisphenol A | 8-30 | 80-05-7 |
| Isophorondiamine | 20-40 | 2855-13-2 |
| Benzyl alcohol | 15-50 | 100-51-6 |
| TOTAL | 100 | |

In another embodiment of the present invention, the formulation of composition A appears in table 6.

TABLE 6

| ingredients in composition A | | |
|---|---|---|
| | WEIGHT PERCENT % | CAS NO. |
| Diethylenetriamine | 32.1 | 1140-40-0 |
| Bisphenol A | 11.5 | 80-05-7 |
| Isophorondiamine | 34.5 | 2855-13-2 |
| Benzyl alcohol | 21.9 | 100-51-6 |
| TOTAL | 100 | |

According to some embodiments of the present invention, composition B (see tables 7-8) comprises Epoxy resin (comprising, for example, 35068-38-6 Phenol-Formaldehyde Polymer Glycidyl Ether and 68609-97-2 Alkyl (C12-C14) glycidyl ether) and acts as a resinous composition.

TABLE 7

| ingredients in composition B | | |
|---|---|---|
| | WEIGHT PERCENT % | CAS NO. |
| Phenol-Formaldehyde Polymer Glycidyl Ether | 0-20 | 35068-38-6 |
| Alkyl (C12-C14) glycidyl ether) | 5-15 | 68609-97-2 |
| YD-128 | 50-96% | 25068-38-6 |
| Dynaslan glymo | 0-1 | 2530-83-8 |
| Byk 066 | 0-4 | 108-83-8 |
| TOTAL | 100 | |

In another embodiment of the present invention, the formulation of composition B appears in table 8.

TABLE 8

| ingredients in composition B | | |
|---|---|---|
| | WEIGHT PERCENT % | CAS NO. |
| Phenol-Formaldehyde Polymer Glycidyl Ether | 3 | 35068-38-6 |
| Alkyl (C12-C14) glycidyl ether) | 15 | 68609-97-2 |
| YD-128 | 75 | 25068-38-6 |
| Dynaslan glymo | 0-3 | 2530-83-8 |
| Byk 066 | 0-5 | 108-83-8 |
| TOTAL | 100 | |

The cut fibers 815 are mixed with mix 2 805 in a third mixing step 816 to form a third mix 817. This is the fiber-in-sealant composition.

A non-limiting example of the carrier fluid composition appears in Table 9 hereinbelow.

TABLE 9

| Example of a carrier fluid composition. | | |
|---|---|---|
| Component | Weight percent range | CAS NUMBER(S) |
| Pyrogenic silica | 0-3% | 112945-52-5 |
| Synthetic aluminum hydroxide | 0-3% | 21645-51-2 |
| Hydroxyethyl cellulose | 0.1-5% | 9004-62-0, 127-09-3, 9004-34-6, 107-22-2 |
| Synthetic oil | 5-30% | 120962-03-0 |
| water | 20-99% | |
| total | 100% | |

Another non-limiting example of a carrier fluid composition 821 is provided in Table 10 hereinbelow.

TABLE 10

| Example of a carrier fluid composition. | | |
|---|---|---|
| Component | Weight percent range | CAS NUMBER(S) |
| Pyrogenic silica | 0.4 | 112945-52-5 |
| Synthetic aluminum hydroxide | 0.75 | 21645-51-2 |
| Hydroxyethyl cellulose | 4.1 | 9004-62-0, 127-09-3, 9004-34-6, 107-22-2 |
| Synthetic oil | 18.05 | 120962-03-0 |
| water | 20-99% | |
| total | 100 | |

In some cases, the vegetable oil may be replaced in part or fully by silicone oil, a synthetic oil, one or more fatty acids, a surfactant, a non-vegetable oil or combinations thereof.

In another embodiment of the present invention, a non-limiting example of mix 3, 817 appears in table 11 hereinbelow.

TABLE 11

Example of a mix 3 (817) composition

| NAME | WEIGHT PERCENT RANGE % |
|---|---|
| Composition A | 5-30 |
| Composition B | 15-70 |
| Composition 807 | 15-70 |
| Cut fibers 815 | 1-20 |
| TOTAL | 100 |

In another embodiment of the present invention, a non-limiting example of mix 3 (fiber-in-sealant composition), 817 appears in table 12 hereinbelow.

TABLE 12

Example of a mix 3 (817) composition

| NAME | WEIGHT PERCENT RANGE % |
|---|---|
| Composition A | 10-20 |
| Composition B | 30-50 |
| Composition 807 | 30-50 |
| Cut fibers 815 | 5-15 |
| TOTAL | 100 |

A non-limiting example of the fiber-in-sealant-in-carrier fluid (FISIC) composition appears in Table 13 herein below.

Table 13 Example of Fiber-in-Sealant-in-carrier fluid (FISIC) composition 819

| Component | Weight percent range % |
|---|---|
| A | 0.5-4 |
| B | 1-7 |
| Cut fibers (815) | 0.5-5 |
| Silica (807) | 1-6 |
| Carrier fluid 821 | 85-98 |
| total | 100 |

The ratio of A to B ratio is typically between 10:90 to 50:50, between 15:85 to 40:60, between 20:80 to 35:65, between 25:75 to 30:70. In one embodiment the ratio of A:B is 30:100 i.e. 30 parts of A to 100 parts of B. A and B are as defined herein. The resultant first mix 804 is then mixed in a second mixing step 806 with a silica formulation 807.

In a second mixing step 806, ground silica formulation 807 (comprising cristobalite (CAS Number 4808-60-7), Aluminum oxide CAS Number: 1344-28-1, Iron(III) oxide 1309-37-1 and Titanium(IV) oxide, anatase 1317-70-0) is mixed with first mix 804 to form a second mix 805. Typically, the ratio of silica formulation 807 to first mix 804 is 0.1:0.9, 0.2:0.8, 0.3:0.7, 0.4:0.6 or 0.5:0.5. Preferably the ratio is between 0.3:0.7 to 0.5:0.5. The second mix 805 is mixed with cut fibers 815 in a third mixing step 816. Typically, the ratio of cut fibers 815 to second mix 805 is 0.01:0.99, 0.05:0.95, 0.1:0.9, 0.15:0.85 or 0.5:0.5. Preferably the ratio is between 0.03:0.97 to 0.15:0.85. A carrier fluid 821, as exemplified in Tables 9-10 is introduced and mixed with third mix 817 in a fourth mixing step 818. Typically, the ratio of third mix 817 to carrier formulation 821 is 0.1:0.9, 0.2:0.8, 0.3:0.7, 0.4:0.6, 0.5:0.5, 0.6:0.4, 0.7:0.3, 0.8:0.2 or 0.9:0.1. Preferably the ratio is between 0.3:0.7 to 0.5:0.5. A non-limiting example of a carrier fluid composition 821 is provided in Table 14 hereinbelow.

TABLE 14

Example of a carrier fluid composition.

| Component | Weight percent range | CAS NUMBER(S) |
|---|---|---|
| Pyrogenic silica | 0-3% | 112945-52-5 |
| Synthetic aluminum hydroxide | 0-3% | 21645-51-2 |
| Hydroxyethyl cellulose | 0.1-5% | 9004-62-0, 127-09-3, 9004-34-6, 107-22-2 |
| Synthetic oil | 5-30% | 120962-03-0 |
| water | 20-99% | |

A final FISIC composition comprising fibers 819, is then ready for use.

EXAMPLE 5

In this example, the values percent of compositions A and B, and exemplary weight concentration ranges are disclosed.

Composition of Material A (%):
Bisphenol A 50.0-70.0 (%)
Glycidyl Ether 7.0-20.0 (%)
Inert powdered filler 10.0-20.0 (%)
Clay 0-2.0 (%)
A detergent precursor 0-5.0 (%)
A corrosion resistance provider 0-3.0 (%)
Hydrophobic liquid filler 2.0-5.0 (%)
Inert liquid filler 4.0-7.0 (%)
Silicon dioxide 0.5-1.0 (%)
Iron oxide hydroxyl 0.1-0.5 (%)
Composition of Material B (%):
Diethylene thiamine 0-23.0 (%)
4.4-isopropylidenediphenol 0-16.0 (%)
Isophorondiamine 0-31.0 (%)
Benzyl alcohol 0-31.0 (%)
A surfactant 0-1.0 (%)
Detergent precursor 0-5.0 (%)
Inert powdered filler 5-15.0 (%)
Polyoxypropylene thiamine 0-70.0 (%)
A corrosion resistance provider 0-5.0 (%)
Clay 0-4.0 (%)
4-nonylphenol, branched 0-15.0 (%)
Silicon dioxide 0.2-2.0 (%)
Iron oxide hydroxyl 0-0.6 (%)
Inert liquid filler 1-6.0 (%)
Hydrophobic liquid filler 1.0-6.0 (%)

These materials once cured serve to provide robust long term plugging of the leakage with a longevity of similar order of magnitude to the remaining useful life of the host pipe. They also serve to withstand changing environmental conditions. The cured product having a similar thermal coefficient in order of magnitude to the host pipe typically expands and contracts under changing temperatures in unison with the host pipe so as not to create a secondary leak under these conditions.

EXAMPLE 6

This example shows the composition of the sealant plug covering the hole in the pipe and the pipe remains in the field of repair of pipelines.

| CAS # | Name component material | Content, % |
|---|---|---|
| 80-05-7 | Bisphenol A | 39 |
| 668609-97-2 | Glycidyl ether | 11 |
| 21645-51-2 | Inert powder filler (synthetic aluminum | 20 |
| 67-53-0 | A corrosion resistance provider | 3 |
| 120962-03 | Rapeseed oil | 6.1 |
| 112945-52 | Silicon dioxide | 1 |
| 20344-49 | Iron oxide hydroxyl | 0.3 |
| 1140-40-0 | Diethylene thiamine | 3.5 |
| 80-05-74.4 | Isopropylidenediphenol | 2.5 |
| 2855-13-2 | Isophorondiamine | 4 |
| 100-51-6 | Benzyl alcohol | 4 |
| 9009-54-5 | Polyurethane | 2 |
| 9003-04-7 | Polyacrylate (Tamcril- 15) | 3 |
| 9004-62-9 | Berol NP- 10 ( 9) | 0.4 |
| 9004-62-0 | Hydroxyethyl cellulose | 0.1 |
| 8050-81-5 | Antifoam APRU DF- 7010 | 0.1 |

Reference is now made to FIG. 9, which is a simplified pictorial illustration of a multi-ply fiber 900, in accordance with an embodiment of the present invention. The fiber may comprise 1-5 plies, 902, 904, 904, 908, 910 or more, for example.

FIG. 10 is a simplified pictorial illustration 1000 of a FISEC-sealed leak 1008 in a cast-iron pipe 1002, in accordance with an embodiment of the present invention.

In pipes 1002 such as cast iron, asbestos cement, PVC, etc. that leak due to defects in the watertight joints, the fibers-in-sealant 1008 provides the necessary caulking mechanism to reseal the leak. The fibers-in-sealant are introduced into the leaky joint area by the leak flow forming a solid seal between the pipe and one or more outer casings 1004, 1006.

FIG. 11a is a simplified pictorial illustration 1100 of a longitudinal defect 1104 in a plastic pipe 1102, in accordance with an embodiment of the present invention.

FIG. 11b a simplified pictorial illustration 1150 of a fiber-in-sealant cure 1152 within an inner surface 1106 of the longitudinal defect 1104 in the plastic pipe 1102 of FIG. 11a, in accordance with an embodiment of the present invention.

In plastic pipes such as HDPE, MDPE, PVC etc., longitudinal defects, such as cracks 1104 may form from exposure to freezing temperatures, over-pressurization or defects in the manufacturing or pipelaying process (FIG. 11a). The fibers-in-sealant are introduced into leaky cracks by the leak flow forming a solid seal 1152 from within (FIG. 11b) on the inner surface. The curing of the sealant provides for long term longevity of the seals to prolong the serviceability of the pipe.

It should be understood that all the flowcharts and methods herein may be repeated in part or fully to seal a number of leakages. Moreover, in some cases the methods or parts thereof may be repeated to improve the sealant and/or curing properties of the seal and/or cure to properly seal one or more pipelines. The flowcharts are simplified herein, for the purpose of explaining the invention, and should not be deemed limiting.

The references cited herein teach many principles that are applicable to the present invention. Therefore the full contents of these publications are incorporated by reference herein where appropriate for teachings of additional or alternative details, features and/or technical background.

It is to be understood that the invention is not limited in its application to the details set forth in the description contained herein or illustrated in the drawings. The invention is capable of other embodiments and of being practiced and carried out in various ways. Those skilled in the art will readily appreciate that various modifications and changes can be applied to the embodiments of the invention as hereinbefore described without departing from its scope, defined in and by the appended claims.

REFERENCES

Bogoeva-Gaceva, G, Avella, M., Malinconico, M., Buzarovska, A., Grozdanov, A., Gentile, G., & Errico, E. (2007). Natural fiber eco-composites. Polymer composites, 28(1), 98-107.

Célino, A., Fréour, S., Jacquemin, F., & Casari, P. (2014). The hygroscopic behavior of plant fibers: A review. Frontiers in chemistry, 1, 43.

Mwaikambo, L. Y., & Ansell, M. P. (2002). Chemical modification of hemp, sisal, jute, and kapok fibers by alkalization. *Journal of applied polymer science*, 84(12), 2222-2234.

Wang, B., Sain, M., & Oksman, K. (2007). Study of structural morphology of hemp fiber from the micro to the nanoscale. *Applied Composite Materials*, 14(2), 89.

The invention claimed is:

1. A system for curing at least one leakage site in a pipeline, the system comprising:
   a) at least one gel pig; and
   b) at least one fibers-in-sealant-in carrier fluid (FISIC) composition, adapted to provide a caulking mechanism, wherein said fibers in at least one form selected from the group consisting of: wound fibers, yarns and combinations thereof; and wherein said at least one gel pig and said at least one -in-carrier fluid FISIC composition form a pig train, adapted to move along said pipeline to a region of said at least one leakage and to seal and cure said at least one leakage, wherein said FISIC composition comprises 0.5-5% composition A, 1-7% composition B, 0.5-5% fibers, 1-6% silica and 85-98% carrier fluid, and wherein said fibers are hydrophilic and are adapted to trap said sealant in said FISIC within a three-dimensional structure of at least one of said wound fibers and said yarns and wherein said fibers are adapted to be expanded in said FISIC, thereby curing said pipeline at said at least one leakage site.

2. A system according to claim 1, wherein said at least one FISIC composition comprises 0-2% silica in a particulate form.

3. A system according to claim 2, wherein said at least one gel pig comprises one rear pig.

4. A system according to claim 2, where said fibers are in at least one form selected from the group consisting of: hydrophilic wound fibers and hydrophilic yarns.

5. A system according to claim 4, wherein said yarn is single-ply, 2-ply, 3-ply, 4-ply, 5-ply, 6-ply, 7-ply and 12-ply and combinations thereof.

6. A system according to claim 1, wherein said at least one gel pig comprises two gel pigs and said at least one FISIC composition comprises one FISIC composition.

7. A system according to claim 1, wherein said at least one gel pig comprises three gel pigs and said at least one FISIC composition comprises two FISIC compositions.

8. A system according to claim 1, wherein said pipeline is made of cast iron, asbestos cement, PVC, plastic or combinations thereof.

9. A system according to claim 1, wherein said at least one gel pig comprises:
   a. a cellulosic polysaccharide;
   b. boric acid; and
   c. water.

10. A system according to claim 9, wherein said at least one gel pig further comprises:
    d. a metallic hydroxide.

11. A system according to claim 9, further comprising an oil.

12. A system according to claim 1, wherein said at least one gel pig comprises a rear pig and a front pig of different compositions.

13. A system according to claim 1, wherein said system further comprises a pressurized fluid for propelling said system from a first end thereof along said pipeline.

14. A system according to claim 13, wherein said system further comprises a counter pressurized fluid for counter-pressurizing said pig train from a second end thereof.

15. A system according to claim 14, wherein said counter pressurized fluid is for controlling velocity of movement of said pig train along said pipeline.

16. A system according to claim 1, wherein said pressurized fluid comprises a liquid.

17. A system according to claim 1, wherein said pressurized fluid comprises a gas.

18. A system according to claim 1, wherein said pressurized fluid is at a pressure of 1-150 bar.

19. A system according to claim 1, wherein said pig train is adapted to be introduced to said pipeline from a fire hydrant, from a manhole, vertical, lateral pipe, communication pipe or from a branch pipe.

20. A system according to claim 1, wherein said at least one gel pig comprises:
    a. an alcohol;
    b. a base; and
    c. boric acid.

* * * * *